United States Patent

Schoeppel et al.

[11] Patent Number: 5,854,330
[45] Date of Patent: Dec. 29, 1998

[54] CAPSTAN COMPRISING POLYACETAL-BASED POLYMER COMPOSITION FOR MAGNETIC TAPE CARTRIDGE

[75] Inventors: Wolfgang G. Schoeppel, Neuss; Oliver Gayk, Duesseldorf, both of Germany

[73] Assignee: Minnesota Mining and Manufacturing Company, St. Paul, Minn.

[21] Appl. No.: 931,709

[22] Filed: Sep. 16, 1997

Related U.S. Application Data

[62] Division of Ser. No. 614,793, Mar. 7, 1996.

[51] Int. Cl.$^6$ ....................................................... C08K 3/00
[52] U.S. Cl. ........................... 524/495; 524/476; 524/590; 254/266
[58] Field of Search ............................ 254/266; 524/495, 524/496, 590

[56] References Cited

U.S. PATENT DOCUMENTS

| | | |
|---|---|---|
| 3,133,896 | 5/1964 | Dolce et al. . |
| 3,377,313 | 4/1968 | Jupa et al. . |
| 3,692,255 | 9/1972 | von Behren . |
| 4,391,741 | 7/1983 | Masamoto et al. . |
| 4,480,071 | 10/1984 | Natarajan et al. . |
| 4,517,319 | 5/1985 | Reske et al. . |
| 4,596,847 | 6/1986 | Kasuga et al. . |
| 4,607,808 | 8/1986 | Collins . |
| 4,707,525 | 11/1987 | LaNieve III et al. . |
| 4,780,498 | 10/1988 | Goerrissen et al. . |
| 4,804,716 | 2/1989 | Flexman, Jr. . |
| 4,828,755 | 5/1989 | Kusumgar et al. . |

(List continued on next page.)

FOREIGN PATENT DOCUMENTS

| | | |
|---|---|---|
| 0 116 456 | 8/1984 | European Pat. Off. . |
| 0 117 664 | 9/1984 | European Pat. Off. . |
| 0 127 084 | 12/1984 | European Pat. Off. . |
| 0 136 152 | 4/1985 | European Pat. Off. . |
| 0 167 369 | 1/1986 | European Pat. Off. . |
| 0 257 517 | 8/1987 | European Pat. Off. . |
| 0 247 765 | 12/1987 | European Pat. Off. . |
| 0 327 384 | 8/1989 | European Pat. Off. . |
| 0 339 910 | 11/1989 | European Pat. Off. . |
| 0 432 888 A2 | 6/1991 | European Pat. Off. . |
| 0 449 605 A2 | 10/1991 | European Pat. Off. . |
| 0 498 620 A1 | 8/1992 | European Pat. Off. . |
| 1 193240 | 5/1965 | Germany . |
| 1 544 677 | 7/1969 | Germany . |
| 2 051 028 | 4/1971 | Germany . |
| 28 08 675 | 9/1978 | Germany . |

OTHER PUBLICATIONS

*Encyclopedia of Polymer Science & Engineering*, New York, vol. 4, 1988 (pp. 66–79).

*Encyclopedia of Polymer Science & Engineering*, New York, vol. 11, 1988 (pp. 278–279).

Robert A. von Behren and David P. Smith, *Mechanical Design of a Belt–Driven Data Cartridge*, Adv. Info. Storage Sys., vol. 1, 1991 (pp. 49–59).

*Primary Examiner*—Edward J. Cain
*Attorney, Agent, or Firm*—Eric D. Levinson

[57] ABSTRACT

The invention relates to a method for preparing a polyacetal-based polymer composition with a high impact strength comprising 35–96.5 wt. % of a polyacetal component, 3–40 wt. % of a polyurethane component and 0.5–20 wt. % of a carbon black component with all percentages referring to the mass of the polymer composition, wherein the polyurethane component and the carbon black component are compounded prior to adding the polyacetal component, and the polyacetal-based polymer composition obtainable by such method. The invention further-more relates to a capstan or drive roller for a magnetic tape or data cartridge comprising a polyacetal-based polymer composition which comprises 35–96.6 wt. % of a polyacetal component, 3–40 wt. % of a polyurethane component and 0.5–20 wt. % of a carbon black component with all percentages referring to the mass of the polymer composition.

3 Claims, 1 Drawing Sheet

U.S. PATENT DOCUMENTS

| | | |
|---|---|---|
| 4,831,073 | 5/1989 | Okushiro et al. . |
| 4,978,725 | 12/1990 | Reske et al. . |
| 5,183,860 | 2/1993 | Kashihara . |
| 5,212,222 | 5/1993 | Mitsuuchi et al. . |
| 5,286,807 | 2/1994 | Flexman, Jr. . |
| 5,310,822 | 5/1994 | Kielhorn-Bayer et al. . |

FOREIGN PATENT DOCUMENTS

| | | |
|---|---|---|
| 33 03 760 | 8/1984 | Germany . |
| 33 03 761 | 8/1984 | Germany . |
| 36 28 559A1 | 3/1988 | Germany . |
| 36 28 562 A1 | 3/1988 | Germany . |
| 37 03 232 A1 | 8/1988 | Germany . |
| 38 02 753 | 8/1989 | Germany . |
| 40 07 766 A1 | 9/1991 | Germany . |
| 42 22 834 A1 | 1/1993 | Germany . |
| 42 32 416 | 3/1994 | Germany . |
| 57-85994 | 5/1982 | Japan . |
| 64-1356 | 5/1989 | Japan . |
| 1 201 356 | 8/1989 | Japan . |
| 06 80857 | 3/1994 | Japan . |
| 70 069 47 | 10/1970 | South Africa . |
| 1 017 244 | 1/1966 | United Kingdom . |
| 20 87 263 | 5/1982 | United Kingdom . |
| WO 91/13012 | 9/1991 | WIPO . |
| WO 91/13017 | 9/1991 | WIPO . |

ND POLYMER COMPOSITION FOR
CAPSTAN COMPRISING POLYACETAL-BASED POLYMER COMPOSITION FOR MAGNETIC TAPE CARTRIDGE

This is a division of application Ser. No. 08/614,793 filed Mar. 7, 1996.

FIELD OF THE INVENTION

The present invention relates to a method for preparing a polyacetal-based polymer composition with a high impact strength and to a polyacetal-based polymer composition obtainable by such method.

BACKGROUND OF THE INVENTION

Polyacetal-based polymer compositions are broadly used in many industrial fields. They have been proposed, for example, as material for the components of electrical or electronic appliances, automobile devices or various other machines. In order to enhance the physical properties of such compositions a great variety of additives for polyacetal resins has been discussed in literature.

It has been proposed, for example, in EP 0,167,369; DE 11 93 240; DE 20 51 028; EP 0,116,456 and EP 0,117,664, that the impact strength of polyacetal resins can be improved by the incorporation of polyurethanes. According to DE 36 28 559 and DE 36 28 562 the thermal stability of compositions comprising polyacetal resins and thermoplastic polyurethane elastomers can be improved by adding small amounts of alkaline earth metal silicates or carbonates as heat stabilizers.

Polyacetal resins are furthermore characterized by a high bulk and surface resistivity which, when using them for the manufacture of sliding or rolling parts, results in electrostatic charging, i.e., in the generation of electrostatic noises, surface contamination and adhesion of dust and the like. Various antistatic agents have been proposed for polyacetals in order to improve their electrical properties.

EP 0,432,888 describes compositions comprising a polyacetal resin, a polyurethane, and a polyhydric alcohol fatty acid ester which contains a hydroxyl group and a polyethylene glycol, as an antistatic agent.

Electrically conductive carbon black has been proposed as an antistatic agent, for example, in JP 06-080,857, DE 28 08 675, EP 0,247,765, EP 0,127,084, EP 0,498,620, DE 40 07 766, JP 01-201,356, EP 0,327,384 and JP 57-085,994. It was, however, observed that the addition of carbon black often not only adversely affects the thermal stability of the acetal resin but also results in a degradation reaction. The composite material according to JP 06-080,857 which is obtained by compounding polyacetal, polyurethane and carbon black, is characterized by disadvantageous mechanical properties and, in particular, by a low value of impact strength. JP 01-201,356 proposes adding a polyethylene polymer such as HDPE as a dispersing agent to a composition comprising polyacetal, polyurethane and carbon black. The impact strength, wear resistance and heat stability of the resulting compositions do not meet, however, all practical requirements to a sufficient degree.

Belt driven tape cartridges are frequently used to interface with computers where rapid acceleration and deceleration of the tape are required. U.S. Pat. No. 3,692,255 and R. A. v. Behren, Adv. Info. Storage System, 1 (1991), pp. 49–59 disclosed such a cartridge in which the magnetic recording tape is convolutely wound on two tape spools by an endless flexible belt in frictional contact with the tape on both spools. The endless flexible belt is wrapped around and driven by a capstan or drive roller within the cartridge. The capstan itself is driven by a drive puck which is external to the cartridge and is a portion of a recording/playback tape recorder mechanism into which the cartridge is inserted. The drive puck engages the capstan by means of an access opening provided in a wall of the cartridge.

Capstans have to exhibit a high resistance against abrasion and a high durability in order to meet the stringent mechanical demands. Since a static electric charge builds up on the capstan from the frictional contact between the drive puck and the capstan during operation of the cartridge, the capstan must further-more have an advantageous ESD behavior (Electrostatic Discharge).

The materials proposed for capstans so far, do not always meet the stringent requirements to a practically sufficient degree. U.S. Pat. No. 4,607,808 proposes, for example, a two-piece capstan. The inner sleeve which surrounds the mounting pin includes a polytetrafluoroethylene-filled acetal resin while the remainder of the capstan comprises a carbon-filled acetal resin. This two piece capstan shows a relatively complicated construction and presents more difficulties in manufacture than a one piece design. The capstan of U.S. '808 moreover does not meet all practical requirements to a sufficient degree. WO 91/13,012 purports to have achieved a one piece, wear resistant, charge dispersing tape cartridge capstan comprising a resin matrix having a carbon fiber component and a fluorocarbon component therein.

Selection of a material useful for the preparation of a capstan in a magnetic tape or data cartridge is difficult because the measurement of the bulk conductivity and even of the surface conductivity does not always correspond the ESD behavior of a capstan made of this material, in a real cartridge.

SUMMARY OF THE INVENTION

Figure 1:
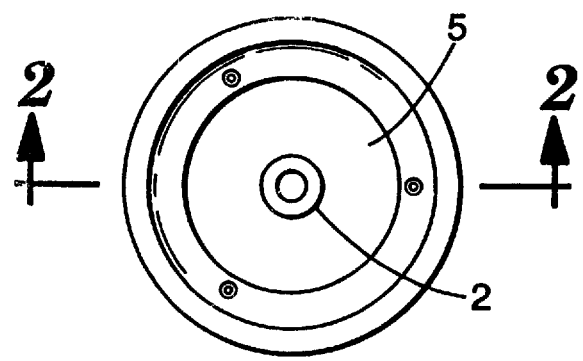
FIG. 1 shows a top view of a preferred capstan construction.

The present invention relates to a method for preparing a high impact strength polyacetal-based polymer composition comprising 35–96.5 wt. % of a polyacetal component, 3–40 wt. % of a polyurethane component and 0.5–20 wt. % of a carbon black component wherein the polyurethane component and the carbon black component are compounded prior to adding the polyacetal component. The weight percentages given above refer to the total weight of the polymer composition.

The invention furthermore relates to a polyacetal-based polymer composition with a high impact strength obtainable by using the above method. The invention also relates to a polyacetal-based polymer composition comprising 35–96.5 wt. % of a polyacetal component, 3–40 wt. % of a polyurethane component and 0.5–20 wt. % of a carbon black component with all percentages referring to the total weight of the polymer composition. The composition exhibits, for an amount of the polyurethane component of 18 wt. %, a hole impact strength of at least 50 kJ/m² as measured according to the hole impact test of DIN 53753.

Finally, the invention relates to the use of above polyacetal-based polymer compositions for the preparation of sliding or rolling components of electrical or electronic devices and especially to a capstan for a magnetic tape data cartridge.

DETAILED DESCRIPTION OF THE INVENTION

Polyacetal resins which are suitable for the preparation of polyacetal-based polymer compositions according to the present invention are well described in the art. Polyacetal resins are characterized as having recurring oxymethylene groups, —$CH_2O$—. Polyacetal resins may be homopolymers or copolymers (including random and block copolymers) containing one or more comonomers. The polyacetals used in the present invention preferably comprise oxymethylene groups in amounts of at least 40 wt. %, more preferably at least 50 wt. %, based on the total weight of the polyacetal.

The polyacetals used in the present invention can be of a linear or branched structure. There is no particular limitation with respect to the molecular weight of the polyacetals but they typically exhibit a number average molecular weight, $M_n$, between 2,000 and 150,000. The melt volume index (MvI) as tested according to ISO 1133-1981 at 190° C./2.16 kg preferably is between 1 and 50 $cm^3$/10 min.

Polyacetal homopolymers can be prepared, for example, by the polymerization of anhydrous formaldehyde or trioxane. These homopolymers are usually stabilized against thermal degradation by end-capping with ester or ether groups or by incorporating stabilizer compounds such as described in U.S. Pat. No. 3,133,896.

Polyacetal copolymers which comprise one or more comonomers in amounts from 1 to 50 wt. %, preferably from 1 to 40 wt. %, based on the total weight of the polyacetal are preferred. Preferably, at least 25 wt. % of the comonomers have at least 2 adjacent carbon atoms, The copolymer is generally stabilized against thermal decomposition by removing unstable terminal moieties by hydrolysis.

Preferred copolymers may be prepared, for example, by cationic copolymerization of trioxane with cyclic ethers or acetals such as, for example, ethylene oxide 1,3-dioxalane, 1,3-dioxane, 1,3-dioxacycloheptane, 1,2-propylene oxide, 1,2-butylene oxide, 1,3-butylene oxide, 2,2-di (chloromethyl)-1,3-propylene oxide or oligo- or polyformals such as, for example, polydioxalane or polybutanediol formal.

Especially preferred copolymers comprising 2 or more comonomers can be obtained by reacting trioxane and a cyclic ether and/or cyclic acetal with one or more monomers comprising two or more polymerizable groups such as, for example, alkylglycidyl formals, polyglycoldiglycidyl ether, alkandioldiglycidyl ether or bis(alkantriol)-triformals. Especially preferred are the diglycidyl ethers of ethylene glycol, 1,4-butanendiol, 1,3-butanediol, cyclobutane-1,3-diol, 1,2-propane-diol, cyclohexane-1,4-diol and 2-dimethyl-4-dimethyl cyclobutane-1,3-diol. These additional di- or higher functional comonomers are preferably used in an amount of 0.05–5 wt. % based on the total weight of the polyacetal.

The polyacetals described above in some detail are intended to be exemplary and by no means limiting. The specific composition of the polyacetal resin is not critical for the present invention and a wide variety of other polyacetals such as, for example, those described in EP 0,327,384, column 2, line 30 to column 6, line 37, which description is herewith incorporated by reference, can be used. The polyacetals described in DE 38 02 753, DE 40 07 766, DE 42 32 416, DE 42 22 834, EP 0,449,605, EP 0,257,517, EP 0,136,152, JP 1-201,356 and JP 06-080,857 are also useful for the preparation of the polymer compositions according to the present invention.

The polyacetal-based polymer compositions according to the present invention comprise a polyacetal component in amounts of 35–96.5 wt. %, preferably at least 40 wt. % and more preferably not less than 50 wt. % based on the weight of the polymer composition. The polyacetal component preferably comprises 1 to 5, more preferably 1 to 3, and most preferably one or two polyacetals.

The polyacetal-based polymer composition according to the present invention furthermore contains a polyurethane component comprising 1 to 6, preferably not more than 5, and more preferably 1 to 3 thermoplastic polyurethanes.

Any known thermoplastic polyurethane may be used in the polymer compositions according to the present invention. Preferably, the polyurethanes are prepared from polyester polyols, polycarbonate polyols, polyether polyols such as polyethylene glycol ethers, polypropylene-glycol ethers, polytetramethylene-glycol ethers or polyacetals having free hydroxyl end groups, and polyisocyanates, in particular diisocyanates, using chain extending agents such as low molecular weight polyols, preferably glycols. Especially preferred are polyurethanes obtained by reacting (i) a diisocyanate component
(ii) a high-molecular weight polyol component comprising one or more polyols having a molecular weight of 500 to 5,500 and
(iii) a low-molecular weight polyol and/or polyamine component comprising one or more polyols and/or polyamines having a molecular weight of 60 to 500.

The diisocyanate component preferably comprises 1–5, especially 1–2 diisocyanates selected from a group of diisocyanates comprising 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, 4,4'-methylene bis(phenyl isocyanate), 2,2-diphenylpropane-4,4'-diisocyanate, p-phenylene diisocyanate, m-phenylene diisocyanate, xylene diisocyanate, 1,4-naphthylene diisocyanate, 1,5-naphthylene diisocyanate 4,4'-diphenyl diisocyanate, azobenzene-4,4'-diisocyanate, m- or p-tetramethylxylene diisocyanate and 1-chlorobenzene-2,4-diisocyanate. The diisocyanates listed are intended to be illustrative but by no means limiting, and the diisocyanate component can comprise other diisocyanates if desired.

The high-molecular weight polyols have a molecular weight of 500 to about 5,500, preferably between 1,000 to 3,500 and are preferably selected from a group comprising polyester (including polycarbonate diols) and polyether diols which each have hydroxyl groups at both ends. A smaller amount of one or more triols or polyols of typically up to 25 wt. % based on the weight of the high-molecular weight polyol component may also be used.

The polyester diol is preferably prepared from one or more alcohols containing at least 2 hydroxyl groups and one or more dicarboxylic acids. Preferred examples of difunctional alcohols include ethylene glycol, 1,3- and 1,2-propylene-glycol, 1,4-butanediol, 1,3-butanediol, 2-methylpentanediol, 1,5-pentanediol, 1,6-pentanediol and 1,12-dodecanediol. The dicarboxylic acids are preferably selected from a group comprising adipic, succinic, sebacic, suberic, methyladipic, glutaric, pimelic, azelaic, thiodipropionic, citraconic and aromatic dicarboxylic acids like, for example, terephthalic and phthalic acid. Furthermore, hydrocarboxylic acids, lactones and carbonates such as, for example, ε-caprolactone and 3-hydroxybutyric acid, may be used for the preparation of polyester diols.

The polyether diol preferably is a condensation product of one or more alkylene glycols such as, for example, ethylene glycol, 1,2- or 1,3-propylene glycol, 1,4-butanediol, and 1,5-pentanediol. Preferred polyetherpolyols are furthermore obtained from tetrahydrofuran, ethylene oxide and/or propylene oxide.

The low-molecular weight polyol and/or polyamine component (iii) preferably comprises one or more compounds selected from the group of straight-chain aliphatic and aromatic diols and diamines. Component (iii) may also contain a smaller amount of triol compounds of up to about 30 wt. % based on the weight of component (iii). Preferred examples of low-molecular weight polyol and polyamine compounds include 1,2-ethanediol, 1,2-propanediol, 1,3-propanediol, 1,4-butanediol, 1,5-pentanediol, 1,6-hexanediol, 1,4-cyclohexanediol, ethylene glycol, propylene glycol, glycerin, hexanetriol, trimethylol propane, hydroquinone diethylol ether, resorcinol ethylol ether, diphenylmethanediamine, m-phenylenediamine and derivatives thereof.

The enumeration of preferred diisocyanates, hydroxyl and amino compounds given above is intended to be illustrative and by no means limitative. Other suitable compounds of components (i), (ii) and (iii) are described, for example, in EP 0,327,384, column 6, line 43 to column 8, line 39 which description is incorporated by reference. Thermoplastic polyurethanes compounds which are suitable for the preparation of the polyacetal-based polymer compositions according to the present invention may be found in, for example, DE 37 03 232, DE 42 32 416, DE 33 03 761, DE 36 28 559, DE 36 28 562, DE 33 03 760, EP 0,136,152, JP 6-080,857 and JP 1-201,356. Regardless of the particular polyurethane reaction, the hydroxyl and optionally the amino components (ii) and (iii) and the diisocyanate component (i) are preferably chosen such that the overall ratio of isocyanate groups to hydroxyl and optionally amino groups is between about 1:1 and 1.08:1 and, in particular, between about 1.02:1 and 1.07:1.

The polyacetal-based polymer compositions according to the present invention include a polyurethane component in amounts of 3–40 wt. %, preferably between 10–40 wt. %, based on weight of the polymer composition.

The carbon black component of the polyacetal-based polymer composition according to the present invention may comprise a wide variety of carbon blacks. Any carbon black produced, for example, by furnace, channel or acetylene process may be used. The carbon black component may comprise one or more carbon blacks and preferably contains 1–5, specifically 1–3 and very particularly 1–2 carbon blacks. The carbon blacks used in the present invention preferably exhibit a surface area BET ($N_2$) of at least 500 $m^2/g$ and especially of at least 750 $m^2/g$. It is, however, also possible to use carbon blacks with a lower surface area BET ($N_2$) of, for example, 100 $m^2/g$ or more. The pore volume (measured as DBP absorption according to DIN 53601) of the carbon blacks preferably is at least 150 and especially at least 200 $cm^3/100$ g.

Particularly useful carbon blacks are commercially available from Degussa, Hanau under the trade name Printex XE2 and from Akzo Chemie under the trade name Ketjen Black EC-300J and EC-DJ-600.

The polyacetal-based polymer compositions according to the present invention comprise carbon black in amounts of 0.5–20 wt. %, preferably 0.5–12.5 wt. %, more preferably 1–10 wt. %, and most preferably between 1–5 wt. %, based on weight of the polymer composition. More than one type of carbon black may be used if desired. When using carbon blacks with a lower surface area BET ($N_2$) of, for example, 100 $m^2/g$ or more, the amount of the carbon black component preferably is at least 4 wt. % and especially at least 5 wt. % or more. The ratio of the mass of the carbon black component to the mass of the polyurethane component preferably is between 0.01 and 0.3 and, in particular, between 0.05 and 0.25.

The polyacetal-based polymer compositions according to the present invention may optionally comprise further components in addition to the polyacetal component, the polyurethane component and the carbon black component if desired. Suitable additives are, for example, plasticizers, formaldehyde scavengers, mold lubricants, mold releasing agents, antioxidants, fillers, colorants, reinforcing agents, light stabilizers, thermal stabilizers, pigments, surface active agents and other additives. The amount of the additives preferably is not too high and is chosen so as not to materially affect the desired mechanical and electrical properties including the advantageous values of impact strength and the advantageous ESD behavior. The amount of the additives preferably is lower than 30 wt. % and in particular lower than 25 wt. % with respect to the weight of the polyacetal-based polymer composition.

The polyacetal-based polymer composition according to the present invention may optionally comprise a fluorinated polymer which serves as a lubricant. The amount of fluorinated polymer may be up to 25%, preferably 5–15%, by weight of the polymer composition. Polytetrafluoroethylene is particularly useful. Ionic salts, preferably lithium salts, may be used to enhance the charge dissipative properties of the polyurethane component. Inorganic fillers may optionally be used in amounts up to about 40%, preferably 0–25%, by weight of the polymer composition. In small quantities, inorganic fillers may serve as nucleating agents to increase the degree of crystallinity and decrease the size of the crystals. The use of inorganic fillers improves moldability by reducing cycle times and decreasing the amount of shrinkage after molding. Inorganic fillers furthermore also increase the modulus and in some cases the wear resistance of the compound, Calcium carbonate is an example of a useful inorganic additive.

Colorants may also be added if desired. Colorants are typically added in very small amounts that have no significant effect on the electrical and mechanical properties of the polyacetal-based polymer compositions according to the present invention.

The additives are described in literature and a person skilled in the art can easily choose suitable additives to optimize the polyacetal-based polymer compositions according to the present invention with respect to the respective application.

The present inventors found that the properties of the polyacetal-based polymer compositions comprising a polyacetal component, a polyurethane component and a carbon black component, depends on the method of preparation applied. In the method according to the present invention, the polyurethane component and the carbon black component are compounded in a first step prior to adding the polyacetal component in a second step.

The term "compounding" as used above and below means that the respective components are sufficiently mixed and kneaded with each other while agitating them for example, by means of a kneader, a Banbury mixer, a mixing roll or a one- or double-screw extruder being equipped with mixing and agitating elements until a sufficiently uniform dispersion or distribution of the components is obtained. The compounded mixture prepared may be, for example, in the form of a powder or pellet. Further details on compounding processes can be taken, for example, from Encyclopedia of Polymer Science and Engineering, New York 1988, vol. 4, pp. 66–79.

The term "sufficiently uniform dispersion or distribution of the components" usually means that the compound prepared appears to be homogenous when being inspected visually without auxiliary devices. Whether a given dispersion or distribution of the components may be assessed to be sufficiently uniform or not, furthermore depends on the specific application. When compared to the components, compounded mixtures are characterized by one or more modified physical and/or chemical properties, and the degree of modification usually depends on the degree of dispersion or distribution of the components. Depending on the intensity and the duration of the compounding process, the compounded mixtures obtained will offer a wide range of grades with respect to one or more of these properties, and it depends on the specific application whether a given modification of properties can be regarded as sufficient.

The compounding process has to be distinguished from the molding process wherein a molten composition comprising a polymer component is filled into a mold by means of, for example, injection molding, blow molding or rotation molding to give the desired finished part. In case of injection molding, for example, the composition which can be, for example, a chemically homogenous polymer material; a rough, macroscopically non-uniform uncompounded mixture of 2 or more components; or a compounded mixture, is typically filled into the molding machine via a hopper and transported to the nozzle. When feeding an uncompounded mixture of 2 or more components into an injection molding machine, this mixture will be homogenized in the injection cylinder to some degree which is, however, considerably lower than the degree of homogenization obtained in a compounding process. Further details on the molding process can be taken, for example, form Encyclopedia of Polymer Science and Engineering, New York 1988, vol. 11, pp. 278–279.

In the present specification, it is differentiated between a C–M type process and an M type process. In a C–M type process the respective components are compounded first with the resulting compounded mixture being subsequently added into the molding machine. In an M-type process, the components are directly fed into the molding machine without being subjected to a prior compounding step. In an M-type process, the components may be roughly mixed prior to feeding them into the molding machine to give a macroscopically non-uniform mixture, if desired.

In the first step of the method according to the present invention, the desired amount of the carbon black component is added to the polyurethane component. Compounding is then performed at a temperature of preferably between 190°–220° C. The first step can be performed as a discontinuous batch process using, for example, a kneader or as a continuous process for example, in a single or twin extruder being equipped with mixing and/or agitating elements. The carbon black component is preferably added in smaller parts or continuously with a rate of, for example, 0.1–20% of the total mass of the carbon black per minute. In case of a batch process it is, however, also possible to add the carbon black component in a single shot.

The time of compounding depends on the specific compounding setup used. When using a kneader like, for example, a Henschel mixer in a batch process, the time of compounding typically is between 30 sec. and 5 min. While the average residence time in a suitably equipped extruder may preferably vary, for example, between 30 sec. and 5 min.

Compounding of the carbon black component with the polyurethane component is an essential step of the method according to the present invention. Although the present inventors do not wish to be restricted by such explanation, they believe the carbon black component migrates into the polyurethane component during such compounding and remains in the polyurethane component during subsequent processing, thus preventing or at least drastically reducing a direct contact between the carbon black component and the polyacetal component. Carbon black acts as a catalyst for the degradation reaction of polyacetal and it is assumed that this degradation reaction results in the distinctly inferior mechanical properties of polyacetal-based polymer composition described in the state of the art.

In the process according to JP 6-80,857, for example, the carbon black component, the polyacetal component and a second polymer component which may be a polyurethane component are compounded simultaneously. JP '857 stresses that the material obtained has a high thermal stability which is explained by a reduced time of contact between the polyacetal component and the carbon black component, resulting from the migration of the carbon black component into the second polymer component. The present inventors, however, observed outgassing of formaldehyde in the beginning of the known compounding process according to JP '857 while no such outgassing was detected during the process according to the present invention. The inventors believe that the experimentally observed differences in the mechanical properties of the known polyacetal-based polymer compositions and of those according to the present invention result from the degradation reaction which takes place at least in the beginning of the known compounding process. The inventors speculate that in the process according to JP '857 it will take some time for the carbon component to migrate into the polyurethane component. Since the application of high shear is typically required in order to destroy carbon black agglomerates, this will result in an intimate contact between the Carbon black component and the polyacetal component and hence cause degradation at least in the initial phase of compounding. While the degree of degradation observed at the beginning of the compounding process according to JP '857 might be too small to effect a distinct reduction of thermal stability, it results in a marked deterioration of the mechanical properties.

These theoretical considerations only are an attempt to explain the experimentally observed differences between the polymer compositions of the present invention and of JP '857, but the present invention is not restricted by or bound to such considerations.

The compound of the carbon black component and the polyurethane component can be prepared as was described above, but it is also possible to use commercially available compounds of polyurethane and carbon black such as, for example, PUR 501 (a polyester polyurethane containing approximately 20 wt. % of conductive carbon black) or PUR 502 (a polyether based polyurethane containing carbon black) which are available through Zipperling, Ahrensburg, Germany, In the second step of the process according to the present invention, the compounded mixture of the carbon black component and the polyurethane component is added to the polyacetal component. In an especially preferred embodiment of step 2, the polyacetal component is compounded with the compounded mixture of the carbon black component and the polyurethane component, while it is also possible in another embodiment of step 2 to simply add the polyacetal component to the carbon black/polyurethane compound, and for example, roughly mix these two components to a macroscopically non-uniform mixture.

The two different sequences of steps may schematically be noted as follows:

I) C[C(PU+CB)+PA]

II) C(PU+CB)+PA wherein PU denotes the polyurethane component, CB is the carbon black component, PA is the polyacetal component, C is a compounded mixture of the materials following in brackets and '+' describes simple mixing or adding of the respective components.

The second compounding step of Sequence I is preferably performed at a temperature between 170° and 220° C. It can be performed as a discontinuous batch process or a continuous process with a continuous process being preferred. The times of compounding are preferably chosen as indicated above for the first compounding step.

The materials obtained in step 2 of the method according to the present invention may subsequently be subjected to a molding process such as, for example, injection molding, blow molding or rotation molding to give the desired finished part. It is, however, also possible to extrude the materials obtained in step 2. In a preferred embodiment of such process, the second step of the process of this invention is performed as a continuous process in a suitably equipped extruder thus directly providing the desired extruded product.

A transmission light photomicrograph (magnification 200×) was taken of a 1 μm thin section obtained from the center region of a circular disc (diameter 100 mm, thickness 4 mm) prepared by injection molding of a polyacetal-based polymer composition obtained according to reaction Sequence I of the present invention. A second transmission light photomicrograph of the same sample was taken at a magnification of 800×. Further details on the method of preparation can be taken from Example 1. The overall sequence of reaction steps used to prepare these samples, thus may schematically be noted as follows:

C[C(PU+CB)+PA]→M

The first photomicrograph shows that the double-compounded polyacetal-based polymer composition according to the present invention are homogenous on a microscopic scale and are substantially free from any larger agglomerates. The higher magnification of the second photomicrograph shows that the carbon black particles are encapsulated in the polyurethane phase which forms a network in the polyacetal matrix. In the transmission light photomicrographs, the polyurethane phase appears to be black while the polyacetal phase is bright and whitish.

A transmission light photomicrograph (magnification 200×) was taken of a 1 μm thin section obtained from the center region of a circular disc (diameter 100 mm, thickness 4 mm) prepared by injection molding of a polyacetal-based polymer composition obtained according to reaction Sequence II of the present invention. A second transmission light photomicrograph of the same sample was taken at a magnification of 800×. Further details on the method of preparation can be taken from Example 2. The overall sequence of reaction steps used to prepare these samples may be schematically noted as follows:

C(PU+CB)+PA→M

The first photomicrograph shows that the material obtained via this reaction sequence is not homogenous on a microscopic scale and exhibits larger agglomerates. These inhomogenieties are, however, are not due to undispersed carbon black but to undispersed carbon black/polyurethane compound which is evident from the smeared structure of these domains. The second photomicrograph shows a homogenous part of the photomicrograph of the first photomicrograph at a higher magnification. The fine structure observed is very similar to that of the structure observed in the high magnification photomicrograph of the sample prepared according to Sequence I. The inventors found that the dispersion of the polyurethane/carbon black compound in the polyacetal phase can be considerably increased in the reaction Sequence II when using a molding machine the screw of which containing, for example, mixing and/or shear elements.

A transmission light photomicrograph (magnification 200×) was taken of a 1 μm thin section obtained from the center region of a circular disc (diameter 100 mm, thickness 4 mm) prepared by injection molding of a polyacetal-based polymer composition obtained by compounding a mixture of the polyacetal component, the polyurethane component and the carbon black component. This state of the art reaction sequence is described in JP 06-080,857. A second transmission light photomicrograph of the same sample was taken at a magnification of 800×. Further details on the method of preparation can be taken from Comparative Example 1. The overall sequence of reaction steps used to prepare these samples may schematically be noted as follows:

C(PU+CB+PA)→M

The first photomicrograph shows that the material obtained via this reaction sequence is not homogenous on a microscopic scale and exhibits larger agglomerates which are however, due to undispersed carbon black. It is evident from a comparison with the first photomicrograph taken from the sample prepared by Sequence II that the inhomogenieties due to undispersed compounded mixture of carbon black/polyurethane exhibit a smeared-out structure while the carbon black agglomerates of the sequence C(PU+CB+PA) are characterized by a sharp-cut appearance. The fine structure of a microscopically homogenous part of the first photomicrograph of is shown at higher magnification in the second photomicrograph. This fine structure is similar for all sequences discussed above.

The samples discussed above were prepared on the same molding machine under identical conditions and thus allow a true and meaningful comparison.

The present inventors surprisingly discovered that the polyacetal-based polymer compositions according to the present invention are characterized by superior mechanical properties and, in particular, by a high impact strength. The double-compounded compositions obtained via reaction Sequence I are especially preferred.

Although the present inventors do not wish to be bound by such explanation, they speculate that the reason for the distinctly improved mechanical properties can be traced back to the step of compounding the carbon black component and the polyurethane component. This step substantially prevents a direct contact between the polyacetal component and the carbon black component. Contrary to this, the degree of homogeneity of the molded composition and/or the presence of larger agglomerates of the PU/carbon black compound seems to be of less impact on the mechanical properties.

The impact strength of the polyacetal based polymer compositions according to the present invention increases with increasing amount of the polyurethane component contained therein. However, the inventors found that polyacetal based polymer compositions according to the present invention exhibit, for the same loading with polyurethane, a distinctly higher impact strength than polyacetal based polymer compositions known heretofore such as described, for example, in JP 06-080,857.

Polyacetal-based polymer compositions, comprising 35–96.5 wt. % of a polyacetal component, 3–40 wt. % of a polyurethane component and 0.5–20 wt. % of a carbon black component, which exhibit, for an amount of the polyurethane component of 18 wt. %, a hole impact strength of at least 50 kJ/m$^2$, especially of at least 55 kJ/m$^2$ and very particular of at least 60 kJ/m$^2$ are preferred. The values of impact strength given above and below refer to the method of measurement as given in DIN 53753, which is described in some detail in the section of test procedures below. The weight percentages given above refer to the weight of the polyacetal-based polymer composition.

The specific electrical bulk resistivity of the polyacetal-based polymer compositions according to the present invention which are obtainable via reaction Sequences I or II, can be varied over a wide range and typically is between $5 \times 10^8$–$5 \times 10^{14}$ Ω cm as measured according to DIN IEC 93. The specific electrical bulk resistivity can be decreased, for example, by increasing the amount of the carbon black component. The inventors found that a better and more uniform dispersion of the carbon black component typically results in higher values of electrical bulk resistivity; this is especially true for small percentages of the PU/carbon black compound. The person skilled in the art can vary the compounding conditions and the percentages of the carbon black component within the range as specified above, to modify and optimize the electrical bulk resistivity with respect to the respective application. The values of electrical bulk resistivity given above and below refer to the method of measurement as given in DIN IEC 93 which is described in some detail in the section of test procedures below. Surprisingly, the polyacetal based polymer compositions according to the present invention are characterized by advantageous values of the electrical bulk resistivity despite the relatively low loading with carbon black.

Polyacetal-based polymer compositions according to the present invention which exhibit, for an amount of the polyurethane component of 18 wt. %, a hole impact strength of at least 50 kJ/m$^2$ and a specific electrical bulk resistivity of $5 \times 10^{14}$ Ω cm or less, are preferred. More preferred are polyacetal-based polymer compositions according to the present invention which exhibit for the above amount of the polyurethane component a hole impact strength of at least 60 kJ/m$^2$ and a specific electrical bulk resistivity of $4 \times 10^{14}$ Ω cm or less. Most preferred are furthermore polyacetal-based polymer compositions according to the present invention having for the above amount of the polyurethane component a hole impact strength of at least 52 kJ/m$^2$ and a specific electrical bulk resistivity of $5 \times 10^{13}$ Ω cm and, in particular, $2 \times 10^{13}$ Ω cm or less.

Besides their advantageous electrical and mechanical properties, the polyacetal based polymer compositions according to the present invention are also characterized by an advantageous ESD behavior. The compositions are therefore useful for the preparation of sliding and rolling components of electrical and electronic devices such as, for example, magnetic tape cartridges, film handlers and tape drives.

The polyacetal-based polymer compositions which comprise 35–96.5 wt. % of a polyacetal component, 3–40 wt. % of a polyurethane component and 0.5–20 wt. % of a carbon black component are suited for the preparation of drive rollers or capstans to be used in belt-driven cartridges. This finding is surprising because the present inventors found that measurement of the bulk conductivity and even of surface conductivity is of limited value for the judgment of the ESD behavior of a drive roller in a real cartridge. The use of polyacetal-based polymer compositions, wherein the carbon black is substantially found within the polyurethane component, is preferred. Capstans comprising a polyacetal-based polymer composition according to the present invention are especially preferred because of the superior mechanical properties of these compositions.

A schematic representation of a belt-driven data cartridge is given, for example, in FIG. 1 of R. A. von Behren et al., Adv. Info Storage Syst., 1 (1991), 49. The tape spools are surface-driven by an elastic, self-tensioning driving belt which extends around the drive roller and two idler rollers. The drive roller and the driving belt attached to it are driven by an external motor drive puck which is a part of the tape recording device. Further details on the construction of a self-driven tape cartridge can be taken from U.S. Pat. No. 3,692,255 which is incorporated herein by reference.

Figure 2:
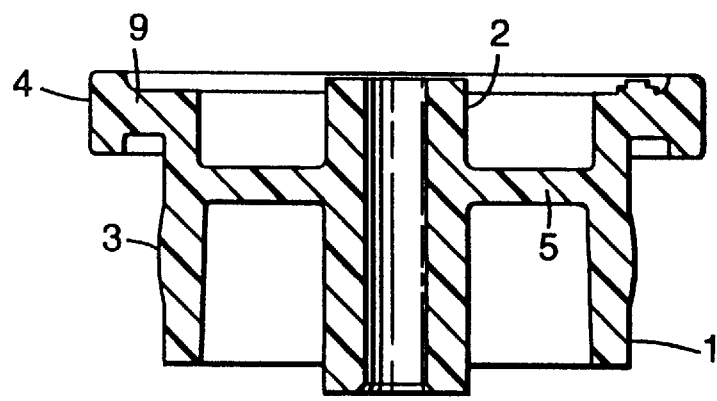
FIG. 2 shows an axial section of the capstan along the lines indicated in FIG. 1.

Polyacetal-based polymer compositions comprising 35–96.5 wt. % of a polyacetal component, 3–40 wt. % of a polyurethane component and 0.5–20 wt. % of a carbon black component, or more preferably the polyacetal-based polymer compositions according to the present invention are especially suited for the preparation of a one-piece drive roller or capstan to be used in belt-driven tape cartridges. The drive roller may exhibit various structures and geometries in order to be adjusted, for example, to the specific geometry of the motor drive puck used or to specific structural features of the tape cartridge. A preferred embodiment of a one-piece drive roller with an improved structure and geometry which enables the part to be easily molded is shown in FIGS. 1 and 2. FIG. I is a top view of a capstan while FIG. 2 is an axial section as indicated in FIG. 1. The capstan exhibits drive puck contacting means 4 which is connected to the drive belt supporting means 1 by T-shaped connecting means 9. The T-shaped connecting means 9 allows use of thin walls the thickness of which corresponds approximately to the thickness of the web 5, hub 2 and drive belt supporting means 1. The drive belt (not shown) contacts the capstan at the crown 3. This crown 3 prevents the drive belt from traveling vertically on the capstan. The distance of the web 5 from the top of the capstan preferably is no less than one fifth, preferably one quarter of the entire height of the capstan. The inner diameter of the hub 2 preferably is no more than 0.11 inches, more preferably no more than 0.1 inches. The specific capstan geometry shown is intended to be illustrative only and by no means limiting, and other capstan geometries can be used if desired.

The one-piece drive roller according to the present invention preferably comprises between 60–100 wt. % and more preferably between 75–100 wt. % of the polyacetal-based polymer composition comprising 35–96.5 wt. % of a polyacetal component, 3–40 wt. % of a polyurethane component and 0.5–20 wt. % of a carbon black component, or more preferably of the polyacetal-based polymer composition according to the present invention. Especially preferred are one-piece drive rollers comprising at least 90 wt. %, and very specifically, 100 wt. %, of these polyacetal based polymer compositions with the polyacetal-based polymer composition according to the present invention being preferred.

The one-piece drive roller according to the present invention may optionally comprise, for example, additional static dissipating polymers, also referred to as polymeric antistatic additives, which contain ionic or polar groups in order to modify and optimize the ESD behavior in the tape cartridge. Examples of useful static dissipating polymers include, for example, polymers containing acrylic esters and polyethylene oxide chains, acrylic polymers having vinyl monomers with quaternary ammonium pendant groups, acrylic polymers containing salts of acrylic acids, polyaniline, and polyvinyl pyrrole.

The drive rollers or capstans according to the present invention and especially the drive rollers or capstans comprising a polyacetal-based polymer composition according to the present invention are characterized by an advantageous ESD behavior and by outstanding mechanical properties, and they fulfill the practical requirements when used in tape and data cartridges to a high to very high degree. The polyacetal based polymer compositions described above and, in particular, the polyacetal-based polymer compositions according to the present invention, are characterized by a low concentration of carbon black of preferably not more than 10 wt. % and especially preferably of 5 wt. % or less. Due to this low loading with carbon black and due to the encapsulation of carbon black in the polyurethane phase, abrasion of carbon black which was frequently observed for state of the art drive rollers, is very effectively suppressed for the drive rollers according to the present invention. The polyacetal based polymer compositions and especially the polyacetal based polymer compositions according to the present invention simultaneously exhibit an advantageous ESD behavior and an electrical bulk resistivity in the antistatic range which combination of properties is especially useful for the preparation of drive rollers.

The following examples are intended to illustrate the invention further.

Test Procedures

Transmission Light Microscopy

1 μm thin, sections were taken from the center region of circular specimens (diameter 100 mm, thickness 4 mm) which had been prepared on an Arburg Allrounder molding machine (270-500-210). Photomicrographs were taken at a magnification of 200× and 800×.

Melt Volume Index

MVI (Melt Volume Index) was measured according to ISO 1133-1981. The conditions of measurement were chosen to be either 190° C./2.16 kg or 200° C./10 kg with the actual conditions being indicated in the respective examples.

Impact Strength

The impact strength was measured using a hole impact test according to DIN 53753. For these measurements, injection molded specimens (50×6×4 mm) were used which were obtained on the Arburg Allrounder molding machine specified above.

Bending Modulus and Flexural Stress

The bending modulus and the flexural stress were measured according to ISO 178-1975. For these measurements, injection molded specimens (140×10×4 mm) were used which were obtained on the Arburg Allrounder molding machine, specified above. The flexural stress was measured at a conventional deflection of 3.5%, which corresponds to a deformation of 6 mm for a specimen thickness of 4 mm, The span length was 60 mm. Measurements were taken at 1 mm/min. for modulus and 5 mm/min. for flexural stress.

Specific Electrical Bulk Resistivity

Specific electrical bulk resistivity was measured according to DIN IEC 93. The electrode size was 5 cm$^2$. The measurements were performed on circular injection molded specimens obtained on the Arburg Allrounder molding machine specified above (diameter=100 mm, thickness=4 mm).

Prior to the measurement the contact areas were plated with a silver-containing lacquer (available through Acheson) in order to provide proper contact to the surface. The specific electrical bulk resistivity was measured between the gate and three different contact locations, with one of them being directly opposed to the gate (center position), while the other two contact areas were symmetrically arranged on a left- and right-hand off-center position. The measurements were performed at three different voltages of 10, 100 and 500V.

Electrostatic Discharge Behavior

A 5.25" form factor data cartridge (DC 6150, available through 3M) was loaded with a one-piece drive roller which was prepared on the Arburg Allrounder molding machine specified above. The geometry and the dimensions of the drive roller were chosen as shown in FIGS. 1 and 2. The cartridge was cycled in a streaming mode at 120 ips. In order to semi-quantitatively assess the ESD behavior, the probe of a digital storage oscilloscope was attached to the opening of the data cartridge cover near the drive roller. The probe was grounded on the chassis of the data cartridge drive. The assessment of the ESD behavior was done on the basis of counting the ESD hits per second.

The measurements were performed math a non-conductive drive puck I consisting of a cast, non-conductive polyurethane, and with a drive puck II consisting of a molded, conductive polyurethane rubber with a specific electrical bulk resistivity of approximately 10$^9$ Ωcm.

EXAMPLE 1

18 part by weight of Desmopan 385 (a polyesterpolyurethane, available through Bayer AG, Leverkusen) was compounded with two parts by weight of Printex XE2 a highly conductive carbon black, available through Degussa, Hanau) in an internal mixer (available, for example, through Werner & Pleiderer) at 190° C. After mixing for about 5 min. the compound was transferred to a milling roll (available, for example, through Guix, Barcelona, Spain) and converted into a sheet which was cut into strips and pelletized in a mill (average pellet size approximately 5×5×5 mm).

The pelletized pre-compound was compounded with 80 parts by weight of Ultraform N2320 (a polyacetal with a medium melt flow index of 9 g/10 min., measured at 190° C./2.16 kg, available through BASF AG, Ludwigshafen) in a single screw extruder (screw diameter 22 mm, L/d value of 23) equipped with a fluted mixing or agitating section at the top of the screw. The compounding conditions were chosen as follows:

| | |
|---|---|
| zone 1 | 170° C. |
| zone 2 | 180° C. |
| zone 3 | 190° C. |
| die | 180° C. |
| screw speed | 40 rmp |
| torque | 550 Ndm |
| pressure | 50 bar |

The compound obtained was transferred to an Arburg Allrounder molding machine where impact test specimens (50×6×4 mm), specimens for the measurements of flexural properties (bending modulus and flexural stress, specimen geometry: 150×10×4 mm), circular discs (diameter 100 mm, thickness 4) to be used in transmission light microscopy and drive rollers were prepared.

The photomicrographs indicated that the compounded and molded mixture was homogeneous on a microscopic scale. The results of the other test procedures are summarized in Table 1.

EXAMPLE 2

18 parts by weight of Desmopan 385 was compounded with two parts by weight of Printex XE2 following the procedure described in Example 1.

The pelletized precompound was added to 80 parts by weight of Ultraform N2320 in the hopper of the Arburg Allround molding machine where test specimens as described in Example 1 were obtained.

The photomicrographs show inhomogeneity on a microscopic scale. However, smeared structure of PU/CB domains indicate that the inhomogeneity is not due to undispersed carbon black. The results of the other test procedures are summarized in Table 1.

EXAMPLE 3

20 parts by weight of PLTR 501 (a compound of polyester polyurethane and conductive carbon black containing approximately 20 wt. % of carbon black, available through Zipperling, Arensburg, Germany) were compounded with 80 parts by weight of Ultraform N2320 in the single screw extruder equipment of Example 1. The compounding conditions were chosen as in Example 1 with the exception that the temperature in zone 2 was 190° C. Subsequently, test specimens corresponding to those of Example 1 were prepared on the Arburg Allrounder molding machine.

The photomicrographs taken are similar to those of Example 1. The results of the other test procedures are summarized in Table 1.

EXAMPLE 4

20 parts by weight of PLTR 501 was added to 80 parts by weight of Ultraform N2320 in the hopper of the Arburg Allround molding machine where test specimens as described in Example 1 were obtained.

The photomicrographs exhibit some streaks of undispersed PLJR 501 but show a higher overall uniformity than the specimens from Example 2.

COMPARATIVE EXAMPLE 1

80 parts by weight of Ultraform N2320, 18 parts by weight of Desmopan 385 and 2 parts by weight of Printex XE2 were filled into the hopper of the single screw extruder equipment of Example 1. The compounding conditions were chosen as in Example 1 with the exception that the temperature in zone 2 was 190° C. Subsequently, test specimens corresponding to those of Example 1 were prepared on the Arburg Allrounder molding machine.

The photomicrographs reveal carbon black agglomerates. The results of the other test procedures are summarized in Table 1.

COMPARATIVE EXAMPLE 2

80 parts by weight of Ultraform N2320, 18 parts by weight of Desmopan 385 and 2 parts by weight of Printex XE2 were filled into the hopper of the Arburg Allround molding machine where test specimens as described in Example 1 were obtained.

The photomicrographs show both undispersed Printex XE2 agglomerates and streaks of undispersed Desmopan 385. The results of the other test procedures are summarized in Table 1.

COMPARATIVE EXAMPLE 3

100 parts by weight of Ultraform N2320 were filled into the hopper of the Arburg Allround molding reaching where test specimens as described in Example 1 were obtained. The results of the test procedures are in Table 1.

TABLE 1

| No. | Melt volume index at 190° C./2.16 kg (cm³/min.) | Impact Strength (kJ/m²) | Flexural Modulus (n/mm²) | Flexural Stress (N/mm²) | Specific Bulk Resis (Ωcm) | Static Hits/sec. puck I | Static Hits/sec. puck II |
|---|---|---|---|---|---|---|---|
| Example 1 | 5.0 | 75 | 1271 | 41.0 | $1.1 \times 10^{14}$ | 20 | zero |
| Example 2 | — | 62 | 1458 | 44.0 | $3.4 \times 10^{14}$ | — | — |
| Example 3 | 5.3 | 55 | 1316 | 41.3 | $1.5 \times 10^{13}$ | zero | zero |
| Example 4 | — | 57 | 1289 | 40.7 | $2.4 \times 10^{9}$ | — | — |
| Comp. Example 1 | 3.5 | 18 | 1277 | 41.6 | $3.3 \times 10^{13}$ | — | — |
| Comp. Example 2 | — | 16 | 1362 | 44.9 | $8.2 \times 10^{13}$ | — | — |
| Comp. Example 3 | 8.5 | 34 | 2003 | 63.1 | $6.6 \times 10^{14}$ | 60 | 40 |

We claim:

1. A capstan for a magnetic tape data cartridge comprising a polyacetal-based polymer composition which comprises 35–96.5 wt. % of a polyacetal component, 3–40 wt. % of a polyurethane component and 0.5–20 wt. % of a carbon black component with all percentages referring to the mass of the polymer composition.

2. The capstan of claim 1 wherein the polymer composition has, for an amount of the polyurethane component of 18 wt. %, a hole impact strength of at least 50 kJ/m$^2$ as measured according to the hole impact test of DIN 53753.

3. The capstan of claim 1 wherein the capstan is a one-piece capstan.

* * * * *